United States Patent
Hart et al.

(10) Patent No.: US 8,858,376 B2
(45) Date of Patent: Oct. 14, 2014

(54) HYBRID POWERTRAIN FOR A MOTOR VEHICLE

(75) Inventors: James M. Hart, Belleville, MI (US); Edwin T. Grochowski, Howell, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 219 days.

(21) Appl. No.: 13/348,753

(22) Filed: Jan. 12, 2012

(65) Prior Publication Data

US 2012/0178573 A1 Jul. 12, 2012

Related U.S. Application Data

(60) Provisional application No. 61/432,137, filed on Jan. 12, 2011.

(51) Int. Cl.
*F16H 3/66* (2006.01)

(52) U.S. Cl.
USPC ................................. 475/5; 475/284; 475/288

(58) Field of Classification Search
USPC .............................................. 475/271–292, 5
See application file for complete search history.

(56) References Cited

U.S. PATENT DOCUMENTS

| | | | |
|---|---|---|---|
| 6,572,507 B1 * | 6/2003 | Korkmaz et al. | 475/276 |
| 6,773,370 B2 * | 8/2004 | Martyka et al. | 475/275 |
| 7,163,484 B2 | 1/2007 | Klemen | |
| 7,244,208 B2 * | 7/2007 | Bauknecht et al. | 475/5 |
| RE41,937 E * | 11/2010 | Shim et al. | 475/276 |
| 2005/0143214 A1 * | 6/2005 | Shim | 475/285 |
| 2006/0270513 A1 | 11/2006 | Klemen | |
| 2006/0270516 A1 | 11/2006 | Klemen | |
| 2008/0011529 A1 * | 1/2008 | Hoher et al. | 180/65.2 |
| 2008/0194368 A1 * | 8/2008 | Ebner et al. | 475/5 |
| 2009/0298638 A1 * | 12/2009 | Jang et al. | 475/275 |
| 2012/0178567 A1 * | 7/2012 | Schoenek et al. | 475/5 |
| 2012/0178568 A1 * | 7/2012 | Schoenek et al. | 475/5 |
| 2012/0178569 A1 * | 7/2012 | Grochowski et al. | 475/5 |

* cited by examiner

*Primary Examiner* — Roger Pang

(57) ABSTRACT

A transmission is provided having an input member, an output member, three planetary gear sets, a plurality of coupling members and a plurality of torque transmitting devices. Each of the planetary gear sets includes first, second and third members. The torque transmitting devices include clutches and brakes.

4 Claims, 1 Drawing Sheet

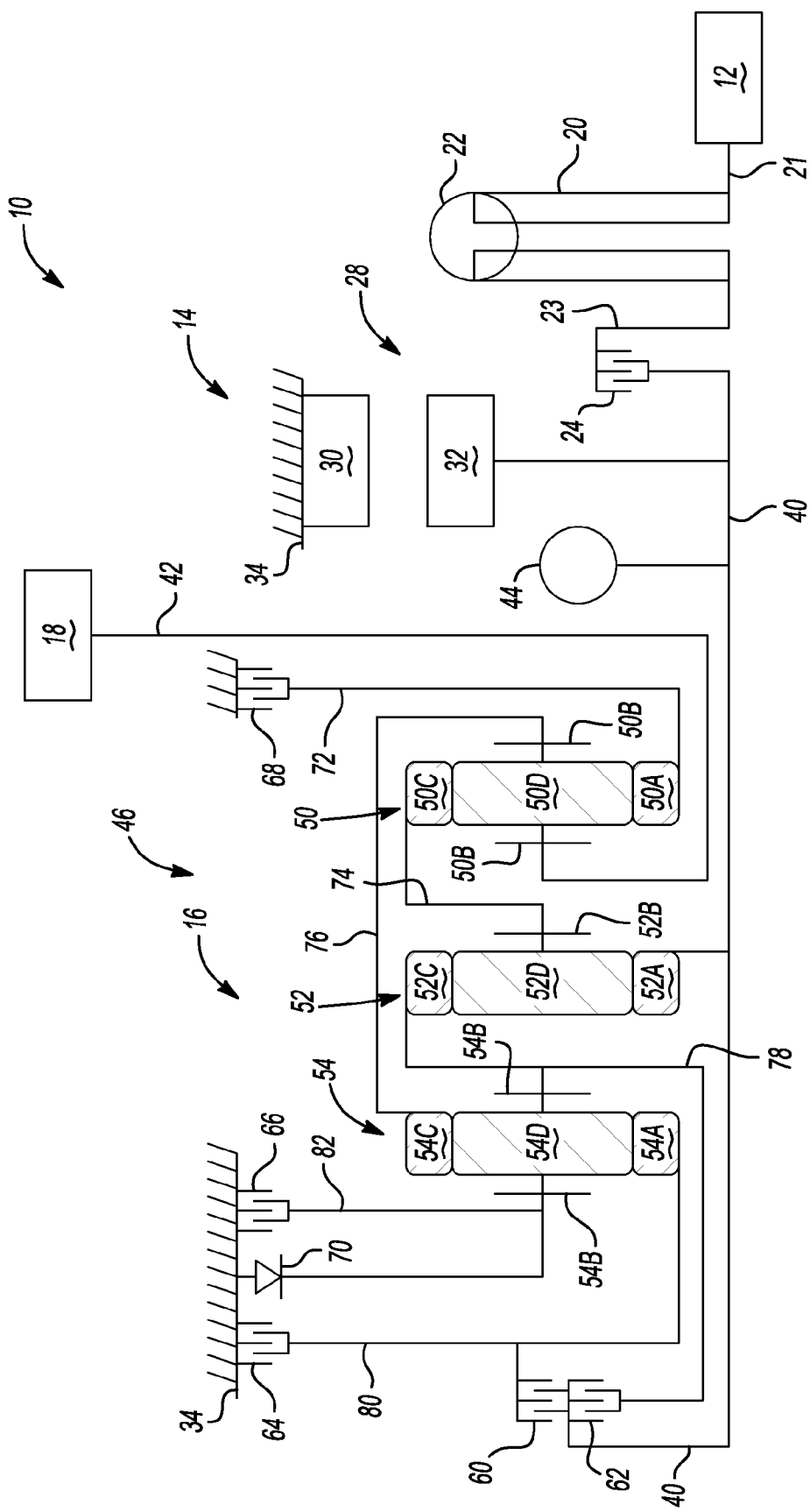

HYBRID POWERTRAIN FOR A MOTOR VEHICLE

CROSS REFERENCE TO RELATED APPLICATION

This application claims the benefit of U.S. Provisional Patent Application Ser. No. 61/432,137, filed Jan. 12, 2011, which is hereby incorporated in its entirety herein by reference.

FIELD

The present disclosure relates to a hybrid powertrain for a motor vehicle and more particularly to a torque transfer arrangement for a transmission having an electric motor coupled to an input shaft of the transmission.

BACKGROUND

The statements in this section merely provide background information related to the present disclosure and may or may not constitute prior art.

Extensive engineering and design effort is currently directed to hybrid powertrains for motor vehicles, especially passenger cars. One of the most promising and active areas involves the addition of an electric motor and associated electronic controller to a motor vehicle powertrain to supplement torque for launches in order that a smaller internal combustion engine may be utilized in the vehicle. Lower horsepower and smaller displacement engines routinely provide improved fuel economy over larger engines and, when supplemented by an electric motor for vehicle launch, provide entirely satisfactory overall performance.

Accordingly, many hybrid powertrains begin as adaptations of conventional and existing powertrains utilizing an internal combustion engine and a transmission having a torque converter and multiple planetary gear assemblies. Into this powertrain is added an electric motor and an appropriate launch and disconnect clutch. Frequently, the torque converter is removed. The addition is not without significant challenges, however, as such constraints as axial length, housing outside diameter, clutch actuation, clutch cooling and integration into the existing powertrain components must be addressed and resolved.

The present invention is directed to a hybrid powertrain which addresses and solves the above delineated challenges.

SUMMARY

In one aspect of the present invention, a powertrain includes an engine and an electric motor module that supplies a driving torque to a transmission. The transmission supplies various gear or speed ratios to a final drive unit. The engine supplies a driving torque to a flywheel. The flywheel includes a damper. The electric motor module includes a launch clutch and an electric motor. The flywheel is connected or coupled to the launch clutch of the electric motor module.

In another aspect of the present invention, a transmission is provided having an input member, an output member, first, second and third planetary gear sets each having first, second and third members. Further, a first interconnecting member continuously interconnecting the third member of the first planetary gear set with the second member of the second planetary gear set. A second interconnecting member continuously interconnects the second member of the first planetary gear set and the output member with the third member of the third planetary gear set. A third interconnecting member continuously interconnects the third member of the second planetary gear set with the second member of the third planetary gear set. Seven torque transmitting mechanisms are selectively engageable to interconnect at least one of the first, second, and third members with at least another of the first, second, third members and a stationary member. An electric motor is continuously interconnected with the first member of the second planetary gear set. A hydraulic pump is continuously interconnected with the first member of the second planetary gear set. The torque transmitting mechanisms are selectively engageable in combinations of at least two to establish a plurality of forward speed ratios and at least one reverse speed ratio between the input member and the output member.

In yet another aspect of the present invention, a first torque transmitting mechanism is selectively engageable to interconnect a flywheel connected to an engine output with the input member and the first member of the second planetary gear set.

In yet another aspect of the present invention, a second torque transmitting mechanism is selectively engageable to interconnect the first member of the second planetary gear set with the first member of the third planetary gear set.

In yet another aspect of the present invention, a third torque transmitting mechanism is selectively engageable to interconnect the first member of the second planetary gear set with the third member of the second planetary gear set and the second member of the third planetary gear set.

In yet another aspect of the present invention, a fourth torque transmitting mechanism is selectively engageable to interconnect the first member of the third planetary gear set with the stationary member.

In yet another aspect of the present invention, a fifth torque transmitting mechanism is selectively engageable to interconnect the third member of the second planetary gear set and the second member of the third planetary gear set with the stationary member.

In yet another aspect of the present invention, a sixth torque transmitting mechanism is selectively engageable to interconnect the first member of the first planetary gear set with the stationary member.

In yet another aspect of the present invention, a seventh torque transmitting mechanism is selectively engageable to interconnect the third member of the second planetary gear set and the second member of the third planetary gear set with the stationary member.

In yet another aspect of the present invention, a first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

In still another aspect of the present invention, an electric motor generally includes a stator and a rotor. The stator includes a plurality of windings or phases and is secured to a transmission housing. The rotor is disposed radially inwardly of the stator. The rotor of the electric motor is interconnected to the transmission input shaft and to a hydraulic pump.

Further aspects, advantages and areas of applicability will become apparent from the description provided herein. It should be understood that the description and specific examples are intended for purposes of illustration only and are not intended to limit the scope of the present disclosure.

DRAWINGS

The drawing described herein is for illustration purposes only and is not intended to limit the scope of the present disclosure in any way.

FIG. 1 is a diagrammatic view of an embodiment of a hybrid powertrain including a six speed transmission, in accordance with an embodiment of the invention.

DETAILED DESCRIPTION

The following description is merely exemplary in nature and is not intended to limit the present disclosure, application, or uses.

With reference to FIG. 1, an exemplary powertrain for a motor vehicle is generally indicated by reference number 10. The powertrain 10 includes an engine 12 and an electric motor module 14 that supplies a driving torque to a transmission 16 which supplies various gear or speed ratios to a final drive unit 18. The engine 12 may be a conventional internal combustion engine or an electric engine, or any other type of prime mover, without departing from the scope of the present disclosure. More specifically, the engine 12 supplies a driving torque to a flywheel, isolator or other connecting device 20 through a shaft or member 21. Flywheel 20 includes a damper 22. The damper 22 is configured to absorb a portion of torque oscillations generated by the engine 12 and transmitted through shaft or member 21 to the flywheel 20. The damper 22 may take various forms and have various properties without departing from the scope of the present disclosure, for example, damper 22 and flywheel 20 are combined to form a dual mass flywheel.

The electric motor module 14 includes a launch clutch 24 and an electric motor 28. The launch clutch 24 is, in the example provided, a plate clutch. However, it should be appreciated that various types of torque transmitting devices may be employed. The flywheel 20 is connected or coupled to the launch clutch 24 through a shaft or member 23.

The electric motor 28 generally includes a stator 30 and a rotor 32. The stator 30 includes a plurality of windings or phases and is secured to a ground, stationary member or a transmission housing 34. The rotor 32 includes a plurality of magnets and/or ferromagnetic members and is disposed radially inwardly of the stator 30. The rotor 32 of the electric motor 28 is interconnected to the transmission input shaft 40, the launch clutch 24 and to a hydraulic pump 44. The stator 30 and the rotor 32 may take various forms and have various properties without departing from the scope of the present disclosure. In operation, when the launch clutch 24 is not engaged or is in a disconnected state the pump 44 is driven independently of the engine speed. Thus, when the launch clutch 24 is applied or engaged torque is transmitted from the flywheel 20 to the transmission input shaft 40 and when the launch clutch 24 is disengaged torque is transmitted from the electric motor 28 to the transmission input shaft 40.

Advantageously, in the present embodiment the launch clutch 24 functions to disconnect the transmission input shaft or member 40 from the engine 12 and functions as a launch device.

The transmission 16 generally includes the transmission input shaft 40, a transmission output shaft 42, a pump 44, and a clutch and gear arrangement 46. The transmission input shaft 40 is connected for common rotation with and is selectively driven by the launch clutch 24. As stated above, the pump 44 is connected to and driven by the rotor 32 of the electric motor 28. The pump 44 may be any positive displacement pump, such as a gerotor pump or a vane pump, operable to provide pressurized hydraulic fluid to both the transmission 16 and the electric motor module 14.

The gear and clutch arrangement 46 includes a plurality of planetary gear set assemblies 50, 52, and 54 interconnected with a plurality of torque transmitting mechanisms 60, 62, 64, 66, 68, and 70. For example, the first planetary gear set 50 includes a sun gear member 50A, a planet gear carrier member 50B and a ring gear member 50C. The sun gear member 50A is connected for common rotation with a first shaft or interconnecting member 72. The ring gear member 50C is connected for common rotation with a second shaft or interconnecting member 74. The planet gear carrier member 50B rotatably supports a set of planet gears 50D (only one of which is shown) and is connected for common rotation with the transmission output shaft or member 42 and a third shaft or interconnecting member 76. The planet gears 50D are each configured to intermesh with both the sun gear member 50A and the ring gear member 50C.

The second planetary gear set 52 includes a sun gear member 52A, a planet carrier member 52B that rotatably supports a set of planet gears 52D and a ring gear member 52C. The sun gear member 52A is connected for common rotation with the transmission input shaft or member 40. The ring gear member 52C is connected for common rotation with a fourth shaft or interconnecting member 78. The planet carrier member 52B is connected for common rotation with the second shaft or interconnecting member 74. The planet gears 52D are each configured to intermesh with both the sun gear member 52A and the ring gear member 52C.

The third planetary gear set 54 includes a sun gear member 54A, a ring gear member 54C and a planet carrier member 54B that rotatably supports a set of planet gears 54D. The sun gear member 54A is connected for common rotation with a fifth shaft or interconnecting member 80. The ring gear member 54C is connected for common rotation with the third shaft or interconnecting member 76. The planet carrier member 54B is connected for common rotation with the fourth shaft or interconnecting member 78 and a sixth shaft or interconnecting member 82. The planet gears 54D are each configured to intermesh with both the sun gear member 54A and the ring gear member 54C.

The torque-transmitting mechanisms or clutches 60, 62 and brakes 64, 66, 68, 70 allow for selective interconnection of the shafts or interconnecting members, members of the planetary gear sets and the transmission housing. For example, the first clutch 60 is selectively engageable to connect the fifth interconnecting member 80 with the transmission input member 40. The second clutch 62 is selectively engageable to connect the fourth interconnecting member 78 with the transmission input member 40. The first brake 64 is selectively engageable to connect the fifth interconnecting member 80 to the stationary member or transmission housing 34 in order to restrict the member 80 from rotating relative to the stationary member or transmission housing 34. The second brake 66 is selectively engageable to connect the sixth interconnecting member 82 to the stationary member or transmission housing 34 in order to restrict the member 82 from rotating relative to the stationary member or transmission housing 34. The third brake 68 is selectively engageable to connect the first interconnecting member 72 to the stationary member or transmission housing 34 in order to restrict the member 72 from rotating relative to the stationary member or transmission housing 34. The fourth brake 70 is a one-way clutch that is selectively engageable to connect the sixth interconnecting member 82 to the stationary member or transmission housing 34 in order to restrict the member 82 from rotating relative to the stationary element or transmission housing 34 in a first rotational direction.

The transmission output shaft or member 22 is preferably continuously connected with the final drive unit or transfer case 18. The final drive unit 18 may include a differential, trans-axles, and wheels (not shown) for providing a final output torque.

In operation, the brake 66 clutch is used as an integrated friction launch device. However, in this embodiment of the present invention, the fourth brake or one-way clutch 70 would not be present. When the launch clutch 24 is disengaged, the pump 44 is driven by the rotor 32 to charge and cool the clutches and brakes independent of the speed of engine 12.

Alternatively, if brake 66 is not used as an integrated friction launch device, the launch clutch 24 must be used as the vehicle launch device. In this case, the pump 44 is not driven until the vehicle is moving, therefore, an auxiliary pump (not shown) is required to charge the clutches and brakes in preparation for launch and to cool the launch clutch 24 at a vehicle stop.

The description of the invention is merely exemplary in nature and variations that do not depart from the gist of the invention are intended to be within the scope of the invention. Such variations are not to be regarded as a departure from the spirit and scope of the invention.

The invention claimed is:

1. A transmission driven by a flywheel connected to an output of an engine, the transmission comprising:
    an input member;
    an output member;
    first, second, and third planetary gear sets each having first, second and third members;
    a first interconnecting member continuously interconnecting the third member of the first planetary gear set with the second member of the second planetary gear set;
    a second interconnecting member continuously interconnecting the second member of the first planetary gear set and the output member with the third member of the third planetary gear set;
    a third interconnecting member continuously interconnecting the third member of the second planetary gear set with the second member of the third planetary gear set;
    only six torque transmitting devices including a second clutch, a third clutch, a first brake, a second brake, a third brake and a one way clutch which are capable of affecting gear ratios,
    wherein a first clutch is selectively engageable to interconnect the flywheel connected to the engine output with the input member and the first member of the second planetary gear set;
    wherein the second clutch is selectively engageable to interconnect the first member of the second planetary gear set with the first member of the third planetary gear set;
    wherein the third clutch is selectively engageable to interconnect the first member of the second planetary gear set with the third member of the second planetary gear set and the second member of the third planetary gear set;
    wherein the first brake is selectively engageable to interconnect the first member of the third planetary gear set with a stationary member;
    wherein the second brake is selectively engageable to interconnect the third member of the second planetary gear set and the second member of the third planetary gear set with the stationary member;
    wherein the third brake is selectively engageable to interconnect the first member of the first planetary gear set with the stationary member; and
    wherein the one-way clutch is for selectively interconnecting the third member of the second planetary gear set and the second member of the third planetary gear set with the stationary member;
    an electric motor continuously interconnected with the first member of the second planetary gear set; and
    a hydraulic pump continuously interconnected with the first member of the second planetary gear set, and
    wherein selectively engaging only the second clutch, the third clutch, the first brake, the second brake, the third brake and the one-way clutch in combinations of at least two establishes six forward speed ratios and at least one reverse speed ratio between the input member and the output member.

2. The transmission of claim 1 wherein the first member of the first planetary gear set, the first member of the second planetary gear set and the first member of the third planetary gear set are sun gears, the second members of the first, second and third planetary gear sets are carrier members and the third member of the first planetary gear set, the third member of the second planetary gear set and the third member of the third planetary gear set are ring gears.

3. The transmission of claim 1 wherein the electric motor has a stator connected to the stationary member and a rotor coupled the first member of the second planetary gear set.

4. A transmission driven by a flywheel connected to an output of an engine, the transmission comprising:
    an input member;
    an output member;
    first, second, and third planetary gear sets each having a sun gear, a carrier member and a ring gear;
    a first interconnecting member continuously interconnecting the ring gear of the first planetary gear set with the carrier member of the second planetary gear set;
    a second interconnecting member continuously interconnecting the carrier member of the first planetary gear set and the output member with the ring gear of the third planetary gear set;
    a third interconnecting member continuously interconnecting the ring gear of the second planetary gear set with the carrier member of the third planetary gear set;
    only six torque transmitting devices including a second clutch, a third clutch, a first brake, a second brake, a third brake and a one way clutch which are capable of affecting gear ratios,
    wherein a first clutch selectively engageable to interconnect the flywheel connected to the engine output with the input member and the sun gear of the second planetary gear set;
    wherein the second clutch selectively engageable to interconnect the sun gear of the second planetary gear set with the sun gear of the third planetary gear set;
    wherein the third clutch selectively engageable to interconnect the sun gear of the second planetary gear set with the ring gear of the second planetary gear set and the carrier member of the third planetary gear set;
    wherein the first brake selectively engageable to interconnect the sun gear of the third planetary gear set with a stationary member;

wherein the second brake selectively engageable to interconnect the ring gear of the second planetary gear set and the carrier member of the third planetary gear set with the stationary member;
wherein the third brake selectively engageable to interconnect the sun gear of the first planetary gear set with the stationary member; and
wherein the one-way clutch for selectively interconnecting the ring gear of the second planetary gear set and the carrier member of the third planetary gear set with the stationary member;
an electric motor continuously interconnected with the sun gear of the second planetary gear set; and
a hydraulic pump continuously interconnected with the sun gear of the second planetary gear set, and
wherein selectively engaging only the second clutch, the third clutch, the first brake, the second brake, the third brake and the one-way clutch in combinations of at least two establishes six forward speed ratios and at least one reverse speed ratio between the input member and the output member.

\* \* \* \* \*